United States Patent Office 3,098,140
Patented July 16, 1963

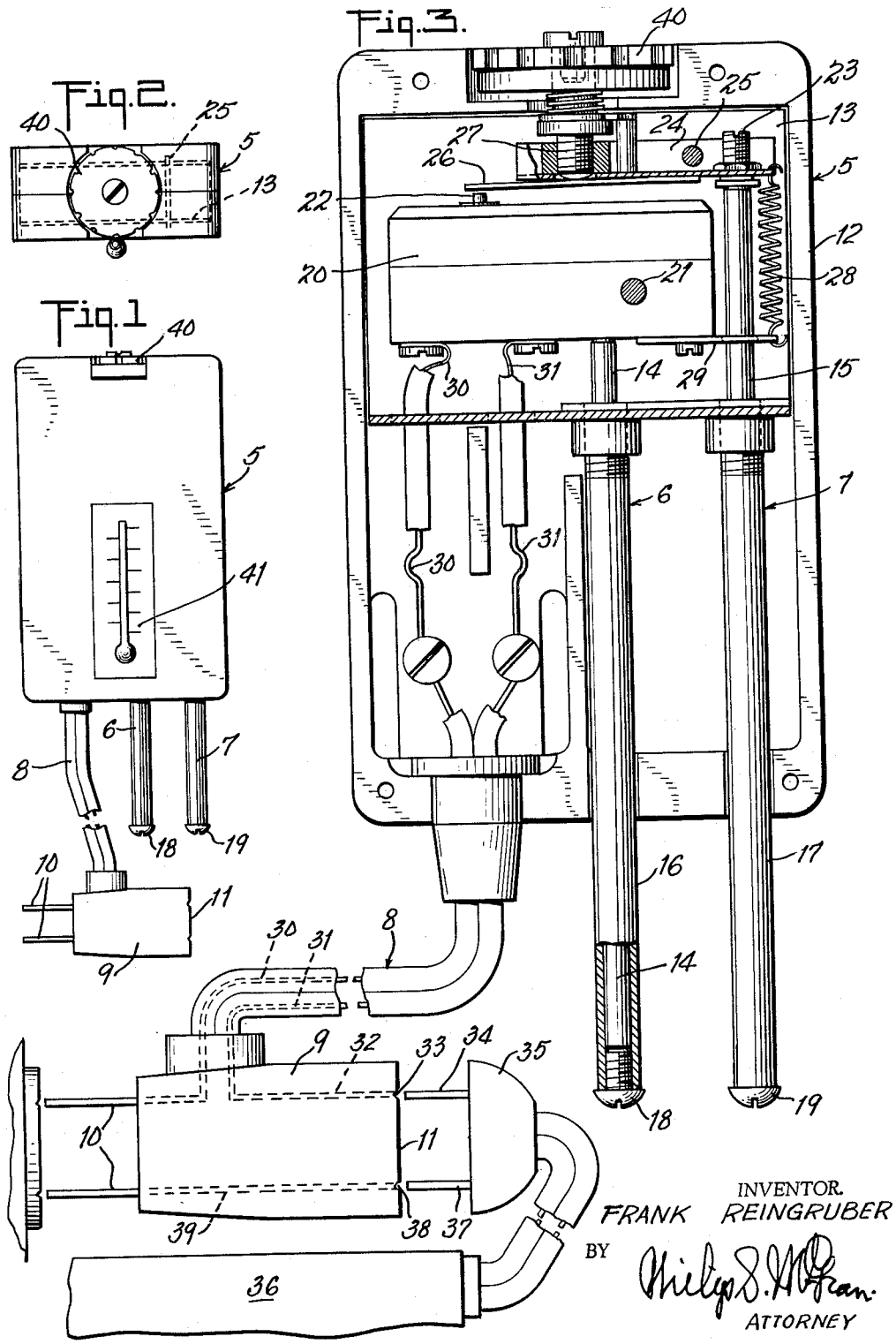

3,098,140
QUICK ACTING, SENSITIVE REMOTE CONTROL FOR ROOM HEATING AND COOLING UNITS
Frank Reingruber, Intervale, N.H., assignor to General Thermostat Corporation, Bartlett, N.H., a corporation of New Hampshire
Filed Mar. 15, 1962, Ser. No. 179,882
6 Claims. (Cl. 200—137)

The invention herein disclosed relates to the control of room heating and cooling units.

Such units have usually been controlled by thermostats mounted on and forming part of such units.

This close relationship of heater or cooler and thermostat has meant that the thermostat, to a large extent, has been governed by temperature of the heater or cooler rather than by temperature of the room to be conditioned.

Objects of the present invention are to provide a control which will be sensitive to the room temperature rather than temperature of the heater or cooler and which will act quickly to restore or maintain the desired temperature conditions.

Accordingly the invention comprises a thermostat of the "probe" type, adapted to be located in any temperature variable portion of a room, at a point removed from the heater or cooler so as to be unaffected by heater or cooler conditions and made up of a pair of thermostatic probes connected to operate additively, both in assessing room temperature and in acting quickly to apply corrective measures.

Other features of the invention are concerned with supplying this double probe thermostat in a form enabling it to be quickly and easily applied to the control of any ordinary room heater or cooler presently in use.

Other novel features of the invention and further objects accomplished are set forth or will appear in the course of the following specification.

The drawing accompanying and forming part of the specification is illustrative of present practical commercial embodiments of the invention but structure may be modified and changed as regards the immediate illustration, all within the true intent and scope of the invention as hereinafter defined and claimed.

FIG. 1 in the drawing is a view in elevation of one of the double probe thermostatic units with extension cord and connecting plug enabling it to be located at any desired control point and be connected to a service outlet, ahead of the heater or cooler to be controlled.

FIG. 2 is a top plan view of the thermostat unit.

FIG. 3 is a broken, part sectional and part diagrammatic view showing the complete control, including electrical connections.

FIG. 1 shows how the invention may be made up as a single unit consisting of a thermostat 5 having air exposed probes 6 and 7 and provided with an extension cord 8, enabling it to be placed in different selected locations, terminating in a connecting plug 9, having blades 10 enabling it to be plugged into a service outlet and provided with outlet contacts at 11 for reception of the blades of a plug connected to a heater or cooler which is to be controlled.

FIG. 3 shows details of construction and wiring connections.

The thermostat comprises a suitable base 12 of insulating material, adapted to be hung up on a wall or supported in any way at a location where it will properly position the probes 6 and 7 in the atmosphere which is to be sensed and which is to be controlled.

The vital parts of the thermostat are supported by a U-shaped frame 13 mounted in the base, which latter may be constructed in companion parts or halves, as shown in FIG. 2.

The probe thermostats 6 and 7 are shown made up of rods 14, 15 of nickel, Invar, ceramic or other material of low expansive ratio, within tubes 16, 17 of aluminum, brass, or other higher expansive material. These tubes are anchored to the base of the U-shaped support 13 and the rods enclosed therein are shown engaged by screws 18, 19 in the outer ends of the tubes so as to have a certain amount of adjustment for calibration or other purposes. The screws may be locked in place by soldering or otherwise.

A switch 20 of the so-called "Microswitch" type is shown located between the upstanding sides of the U-shaped frame 13, pivotally supported in this location by a cross pin 21 extending between the sides of the frame.

This pivotally mounted switch is definitely positioned by engagement of the low expansion thermostat rod 14 therewith at a point to one side of the axis 21, thus to locate the actuating button 22 of the switch in a definite position.

The low expansion rod 15 of the other thermostatic element engages the abutment screw 23 of a lever 24 pivoted at 25 between the sides of the frame and carrying a spring tongue 26 operatively engageable with the switch button.

A calibrating screw 27 on lever 24 has a bearing on this spring to set it closer to or further away from the switch button.

A spring 28 connected between lever 24 and a lever 29 extended from the rocking switch, serves to tension the switch into engagement with rod 14 and the switch actuating lever 24 into engagement with rod 15, applying force in the case illustrated tending to separate the switch button and the switch actuating lever.

Thus, in the illustration, if the switch is of the normally closed type, the spring 28 will have the effect of tending to leave the switch normally closed. The thermostatic elements on rise in temperature will both operate to the same effect, by expansion of tubes 16, 17 to lower rods 14 and 15 thus to permit the switch to drop down and the operating end of the switch lever to rise.

Consequently with rise in temperature both thermostatic elements will operate to separate the switch button and switch operating lever.

This would be the desired action for the control of the cooling unit.

If a heating unit is to be controlled a switch of normally open type would be used so as to effect closing of circuit contacts upon contraction of the probe elements from drop in room temperature.

The wiring connections appear in FIG. 3 as wires 30, 31 extending from switch 20 to plug 9, one of these wires 30 going to one blade of the connector plug 9 and the other 31 extended at 32 through that plug to one of the receptacle sockets 33 to be engaged by one blade 34 of plug 35 which is connected with the heating or cooling unit 36, the other wire from that unit being connected by way of the plug blade 37 with the other socket contact 38 of plug 9 and extended through that plug at 39 to the other blade of plug 9.

This special elongated plug with blades at one end to be engaged with a service outlet and sockets at the opposite end to receive the blades of an attachment plug connected with the unit to be controlled and provided at one side with a cord extending from the thermostat and connected in series relation with one blade and with one of the sockets of such special plug enables the control to be assembled as a complete unit, ready to be plugged into service condition ahead of the heater, cooler or other unit to be controlled.

The two probe units provide double exposed area, rendering the device particularly sensitive to temperature conditions and provide double the power and movement required for operating the control switch, assuring quick positive action.

The dual probe construction furthermore provides desired extension of the sensitive thermostatic surface within a compact small size thermostat structure.

This double thermostat also is of light inexpensive construction adapting it to be placed wherever best suited to perform its control purpose.

Adjustment of relative position of the controlling members 20—22 and 26 may be effected originally at the abutment screw 23 on the switch actuating lever and further calibration may be effected if necessary, by the calibrating screw 27 controlling position of the spring finger 26 on the actuating lever.

The calibrating screw 27 is shown operable by a knob 40 countersunk in the head of the thermostat and which may be suitably graduated as to temperature or other conditions.

To show temperature conditions existing at the control point a thermometer may be set in the face of the instrument as indicated at 41 in FIG. 1.

In addition to other advantages, the double, air probe thermostat disclosed is of relatively simple inexpensive construction, with few, durable parts, not liable to get out of order.

The base or body of the instrument may be made in various ornamental or other desirable shapes and may be provided with a hook or other such structure by which it may be hung up on a wall or otherwise supported in a selected location.

To render the control more sensitive to temperature variations the extension 26 of the lever for operating the switch may be a bimetal plate secured to lever 24, biased under thermal conditions to operate in the same manner as the probe electrodes, thus to form a third expansion actuating element, amplifying mechanical motion for operating the switch in cooperation with the other two actuating members, the probe thermostats 16 and 17.

What is claimed is:

1. A quick acting, sensitive, remote control for room heaters or coolers or the like, comprising in combination,
   a control switch,
   electrical connections extending from said switch for effecting control of such a unit,
   actuating members cooperable to effect operation of said switch and
   probe thermostats exposed to air and positioned, one to actuate one of said members and one to actuate the other of said members, both to the same effect in the operation of said switch,
   said switch including a pivotally supported switch body provided with a switch operating button and constituting one of said members and the other of said members being a pivoted lever engageable with said button.

2. A quick acting, sensitive, remote control for room heaters or coolers or the like, comprising in combination,
   a control switch,
   electrical connections extending from said switch for effecting control of such a unit,
   actuating members cooperable to effect operation of said switch and
   probe thermostats exposed to air and positioned, one to actuate one of said members and one to actuate the other of said members, both to the same effect in the operation of said switch,
   said switch including a pivotally supported switch body provided with a switch operating button and constituting one of said members and the other of said members being a pivoted lever engageable with said button,
   a spring finger on said lever constituting that part of the lever engageable with the switch button and
   a calibrating screw on said lever for adjusting the position of said spring finger on said lever.

3. A quick acting, sensitive, remote control for room heaters or coolers or the like, comprising, in combination,
   a control switch,
   electrical connections extending from said switch for effecting control of such a unit,
   actuating members cooperable to effect operation of said switch and
   probe thermostats exposed to air and positioned, one to actuate one of said members and one to actuate the other of said members, both to the same effect in the operation of said switch,
   said switch including a pivotally supported switch body provided with a switch operating button and constituting one of said members and the other of said members being a pivoted lever engageable with said button,
   a lever extended from said pivotally mounted switch and a spring connecting said last mentioned lever with said switch actuating lever.

4. A quick acting, sensitive, remote control for room heaters or coolers or the like, comprising in combination,
   a control switch,
   electrical connections extending from said switch for effecting control of such a unit,
   actuating members cooperable to effect operation of said switch and
   probe thermostats exposed to air and positioned, one to actuate one of said members and one to actuate the other of said members, both to the same effect in the operation of said switch,
   said members being movable toward and away from each other,
   said probe thermostats being arranged both to hold said members against movement in one direction and
   spring means connected to effect movement of said members in said direction, in opposition to said holding effect of said thermostats.

5. A quick acting, sensitive, remote control for room heaters or coolers or the like, comprising in combination,
   a control switch,
   electrical connections extending from said switch for effecting control of such a unit,
   actuating members cooperable to effect operation of said switch and
   probe thermostats exposed to air and positioned, one to actuate one of said members and one to actuate the other of said members, both to the same effect in the operation of said switch,
   said switch including a pivotally supported switch body provided with a switch operating button and constituting one of said members and the other of said members being a pivoted lever engageable with said button and
   a length of thermostatic bimetal on said lever constituting that part of the lever engageable with said switch button.

6. A quick acting, sensitive, remote control for room heater, cooler or like units, comprising in combination, a control switch, electrical connections extending from said switch for effecting control of such a unit, opposed levers pivoted for movement toward and away from each other and arranged by movement toward each other to effect one operation of said switch, and opposite operation of the switch by movement away from each other, spring means urging movement of said levers with respect to each other to effect one of said operations of said switch, two probe thermostats both exposed to the same temperature conditions, one positioned to act on one of said levers and the other positioned to act on the other lever and both arranged to effect movement of said levers in opposition to the relative movement imparted to the levers by said spring means, and whereby the effect of one thermostat is added to that of the other in effecting actuation of said control switch.

References Cited in the file of this patent

UNITED STATES PATENTS

| | | |
|---|---|---|
| 2,037,155 | Stuart | Apr. 14, 1936 |
| 2,297,706 | Jehle et al. | Oct. 6, 1942 |
| 2,799,748 | Stump | July 16, 1957 |
| 2,849,185 | Keyes | Aug. 26, 1958 |
| 2,929,901 | Bloch | Mar. 22, 1960 |

FOREIGN PATENTS

| | | |
|---|---|---|
| 811,270 | France | Apr. 10, 1957 |